(12) United States Patent
Bergman et al.

(10) Patent No.: US 7,970,235 B1
(45) Date of Patent: Jun. 28, 2011

(54) AUTOMATIC REPLACEMENT OF UNDESIRABLE PIXELS IN AN IMAGE

(75) Inventors: Ruth Bergman, Haifa (IL); Hila Nachlieli, Haifa (IL); Gitit Ruckenstein, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1093 days.

(21) Appl. No.: 11/796,946

(22) Filed: Apr. 30, 2007

(51) Int. Cl.
*G06K 9/40* (2006.01)
(52) U.S. Cl. .................. 382/275; 348/666; 358/3.26
(58) Field of Classification Search .................. 348/666; 358/3.26; 382/275
See application file for complete search history.

(56) References Cited

U.S. PATENT DOCUMENTS

| | | | |
|---|---|---|---|
| 6,996,287 B1 | 2/2006 | Weiss | |
| 2003/0012452 A1* | 1/2003 | Trifonov et al. | 382/275 |
| 2006/0290794 A1* | 12/2006 | Bergman et al. | 348/246 |
| 2010/0183237 A1* | 7/2010 | Yamanaka | 382/260 |

OTHER PUBLICATIONS

Bertalmio, M. et al., "Simultaneous Structure and Texture Image Inpainting", IEEE Transactions on Image Processing, Vol 12, No. 8, Aug. 2003.*
Bertalmio, M. et al., "Simultaneous Structure and Texture Image Inpainting", IEEE Transactions on Image Processing, vol. 12, No. 8, Aug. 2003.
Buades, A. et al., "A Review of Image Denoising Algorithms, With a New One", Society for Industrial and Applied Mathematics, vol. 4, No. 2, p. 490-530, 2005.
Chase, P. et al., "Hardware Assisted Dust and Scratch Removal from Scanned Images", 2004 or 2005.
Efros, A. A. et al., "Texture Synthesis by Non-Parametric Sampling", IEEE Inter. Conf. on Computer Vision, Sep. 1999.

* cited by examiner

*Primary Examiner* — Matthew C Bella
*Assistant Examiner* — Gregory F Cunningham

(57) ABSTRACT

In a method of automatically replacing undesirable pixels in an image, a local neighborhood of pixels is identified around an undesirable pixel. In addition, secondary neighborhoods of pixels are identified and feature values of the pixels contained in the local neighborhood and each of the secondary neighborhoods are calculated. The secondary neighborhoods having feature values within a predetermined range of the local neighborhood feature value are classified as candidates for pixel value replacement. Moreover, a replacement pixel value from at least one of the secondary neighborhoods classified as a candidate for pixel value replacement is determined and the undesirable pixel value is replaced with the replacement pixel value.

20 Claims, 5 Drawing Sheets

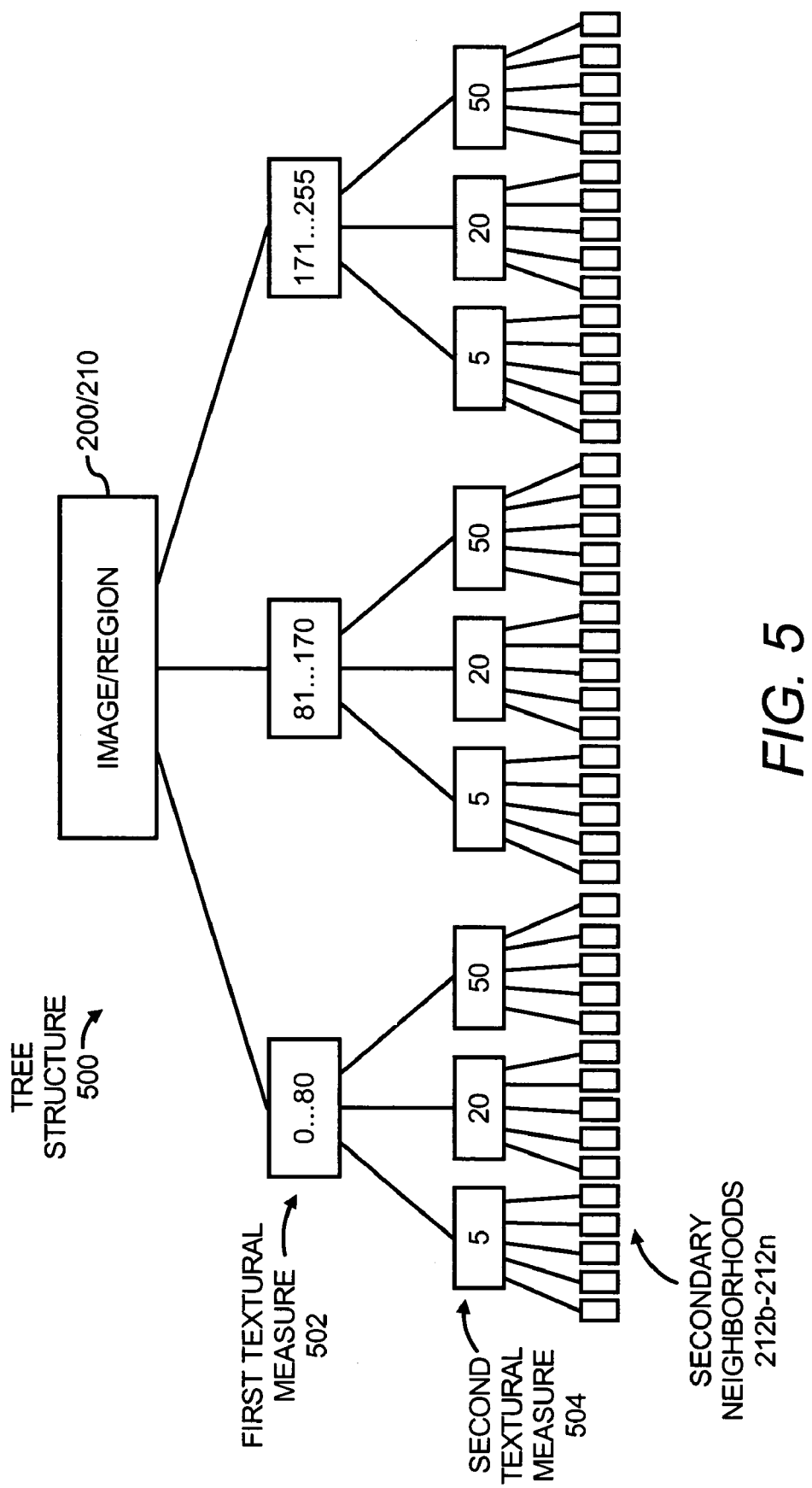

AUTOMATIC REPLACEMENT OF UNDESIRABLE PIXELS IN AN IMAGE

BACKGROUND

It is not uncommon for an image to have light and/or dark artifacts, such as, dust, scratches, and hair on prints, slides, or negatives being scanned by a scanner, which are commonly generated during creation of the image. These defects may distinctly appear as artifacts that are distinguishable from features of the images. In addition, images often contain other undesirable objects, such as, moles and date stamps, that users would like to remove from the images. As used herein, "undesirable objects" may be considered as referring to the artifacts and/or objects, and "undesirable pixels" may be considered as referring to the pixels forming the artifacts and/or objects, that a user may wish to remove from an image.

The undesirable objects are of increasing concern especially with improved optics and imaging systems that provide images of increased color accuracy and resolution. Further, film photographs are often scanned to provide the film images in digital form, and the scanned images are enlarged for viewing, which also increases the appearance of the undesirable objects.

Conventional computer tools are available to automatically identify some of the undesirable objects by simply locating features in the image having a certain characteristic. Other tools allow users to manually identify the undesirable objects in the image. The locations of the undesirable objects, particularly artifacts, are often summarized in a binary defect map, which marks pixels in an image as defective or non-defective. Alternatively, the artifacts are summarized in a continuous defect map that indicates the individual severities of the pixel defects.

Some conventional computer tools replace the pixels identified as being defective, or otherwise selected for replacement, with replacement values from surrounding pixels. For instance, the computer tools often calculate a value of all of the surrounding pixels and use that value to fill in the desired pixel. One drawback of this type of pixel replacement is that all of the pixels in a particular region will have the same appearance, thereby omitting any textural characteristics present around the pixels selected for replacement.

Other conventional computer tools enable users to manually clone a group of pixels from one location and to add them to the desired pixel locations. While conventional cloning features enable textural characteristics to be added into the desired pixel locations, there are however, various drawbacks associated with the conventional cloning features. For instance, relatively larger sections than were originally intended to be copied are often copied and pasted over the pixels. In addition, cloning from one location of an image to another often results in undesirable results because the overall shades of the source and destination areas typically differ from each other.

BRIEF DESCRIPTION OF THE DRAWINGS

Features of the present invention will become apparent to those skilled in the art from the following description with reference to the figures, in which:

FIG. 5 depicts a tree structure which depicts a manner in which the secondary neighborhoods are sorted to facilitate comparisons between a local neighborhood containing an undesirable pixel and the secondary neighborhoods, according to an embodiment of the invention.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method and an apparatus for processing images. The method and apparatus are, more particularly, configured to automatically replace undesirable pixels in an image by determining replacement pixel values for the undesirable pixels. In determining the replacement pixel values, feature values of local neighborhoods around the undesirable pixels are respectively compared with feature values of secondary neighborhoods of pixels. Those secondary neighborhoods having substantially similar feature values are considered as containing candidate pixels for determining the replacement pixel values. In one regard, by comparing the local neighborhoods with secondary neighborhoods for each of the undesirable pixels, replacement values for each of the undesirable pixels may be closer to the actual pixel values because the textures of the original image may be reproduced in a substantially more accurate manner as compared with conventional pixel replacement algorithms.

Also disclosed herein are a method and an apparatus for substantially decreasing the time an electronic apparatus requires to perform an undesirable pixel replacement operation. More particularly, a preprocessing operation may be performed to sort a plurality of secondary neighborhoods according to their respective textural measures. In one regard, the plurality of secondary neighborhoods may be arranged in a tree structure which may be accessed by computing circuitry to facilitate matching of the textural measures of the local neighborhood and the secondary neighborhoods for classifying the secondary neighborhoods as candidates and non-candidates for pixel value replacement.

Figure 1:
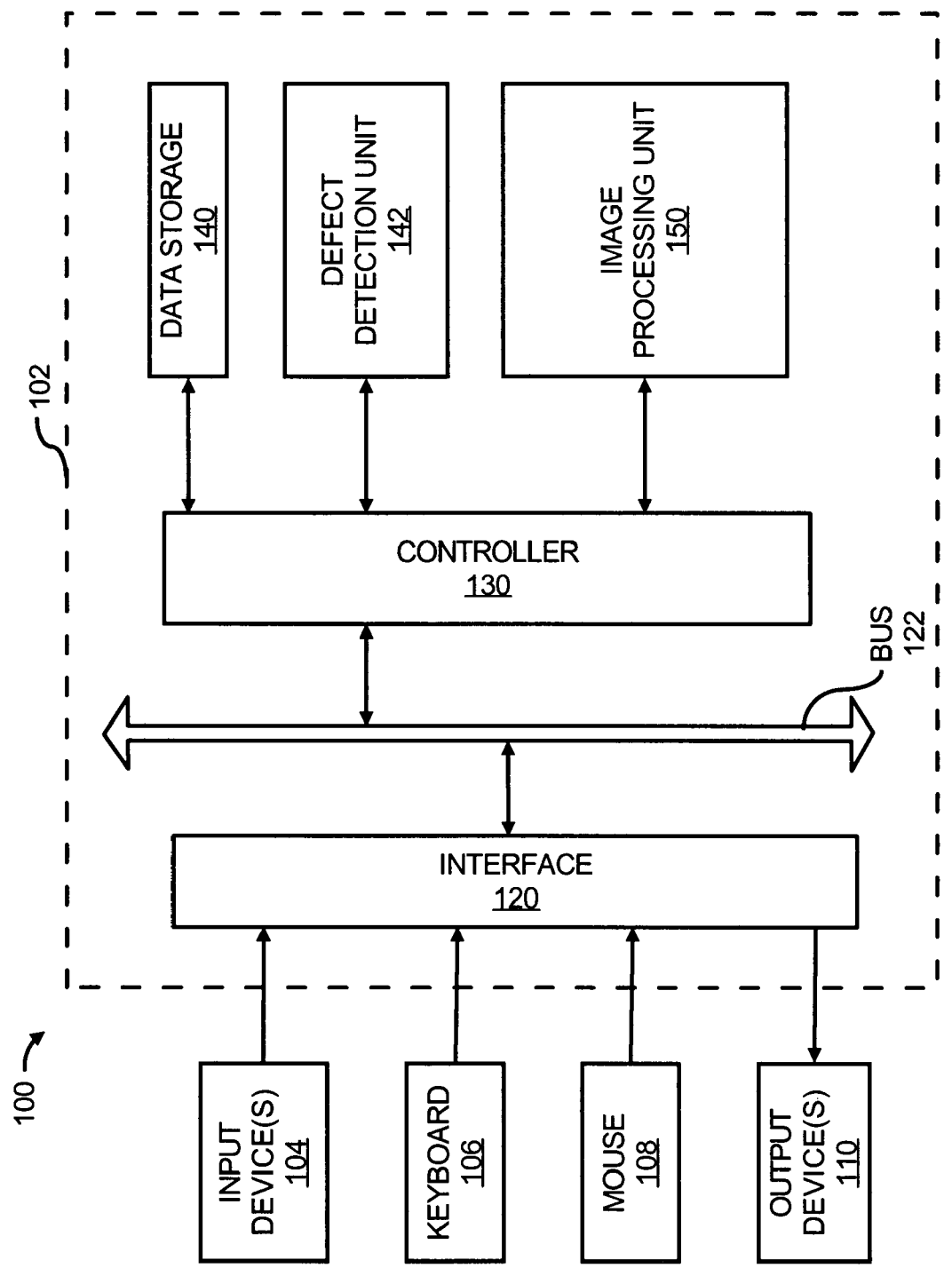
FIG. 1 shows a block diagram of an electronic apparatus configured to implement various image restoration operations, according to an embodiment of the invention.

With respect to FIG. 1, there is shown a block diagram 100 of an electronic apparatus 102 configured to implement various image restoration operations discussed herein, according to an example. It should be understood that the following description of the electronic apparatus 102 is but one manner of a variety of different manners in which the electronic apparatus 102 may be configured. In addition, it should be understood that the electronic apparatus 102 may include additional components and that some of the components depicted in FIG. 1 may be removed and/or modified without departing from a scope of the electronic apparatus 102. For instance, one or more of the input device(s) 104, the keyboard 106, and the output device(s) 110 may be integrally formed with the electronic apparatus 102.

The electronic apparatus 102 may comprise, for instance, a personal computer, a laptop computer, a portable digital assistant, a printing device, an image capture device, etc. In essence, therefore, the electronic apparatus 102 may comprise any reasonably suitable device on which image processing operations may be performed.

As shown in FIG. 1, the electronic apparatus 102 may receive input from one or more input devices 104. The input devices 104 may include, for instance, a scanner, a facsimile machine, a digital camera, a computer, etc.

Users may interact with the electronic apparatus 102 through various user input devices, such as, a keyboard 106 and a mouse 108. Although not shown, the electronic apparatus 102 may also receive input through use of a touchpad, a stylus, a touch sensitive screen, voice commands, or through any other reasonably suitable input means.

The electronic apparatus 102 may output data to one or more output devices 110. The output devices 110 may include any reasonably suitable device configured to enable the electronic apparatus 102 to output an image. The output devices 110 may include, for instance, an electronic display, a printing device, etc. In addition, or alternatively, the output devices 110 may include an interface to a network, such as, an intranet or the Internet, to thus enable data to be communicated to another electronic apparatus over a network. As a further example, an output device 110 may include a removable media drive configured to store data onto removable media, such as, compact discs, digital video discs, SDRAM, magnetic discs, etc.

The input/output devices 104-110 are depicted as communicating with the electronic apparatus 102 through an interface 120. The interface 120 may comprise any reasonably suitable hardware, software, or combination thereof that enables data to be communicated between the input/output devices 104-110 and the electronic apparatus 102. In any regard, the input/output devices 104-110 and the electronic apparatus 102 is configured to communicate under any reasonably suitable wired and/or wireless protocol through the interface 120.

Signals and data from the input devices 104-108 may be communicated to a controller 130 through a bus 122 of the electronic apparatus 102. The controller 130 is generally configured to receive the input signals and data, to process the input signals and data, and to perform various other processing functions in the electronic apparatus 102. In this regard, the controller 130 may comprise a computing device, for instance, a microprocessor, a micro-controller, an application specific integrated circuit (ASIC), or the like, configured to perform the various processing functions discussed herein. In addition, the controller 130 may comprise processing circuitry configured to perform the various processing functions discussed herein.

According to an example, the controller 130 may receive data pertaining to an image from the input device 104, and may store the data in a data storage 140. The data storage 140 may include, for instance, volatile or non-volatile memory, such as DRAM, EEPROM, MRAM, flash memory, and the like. The data storage 140 may also include various software or algorithms that provide the functionality of the controller 130, and, in certain instances, may be located remotely from the electronic apparatus 102.

In addition, the controller 130 may invoke or otherwise implement a defect detection unit 142 to determine whether any of the pixels in an image are defective, for instance, whether there are pixels having missing or improper values in the image. In one regard, the defect detection unit 142 may generate a defect map which indicates the locations of the defective pixels. Alternatively, the defect detection unit 142 may determine whether there are unintended pixels in the image, and may thus generate a void map which indicates the locations of pixels to be replaced from the image. The defect detection unit 142 may employ any reasonably suitable algorithm or process for generating the defect or void map.

Figure 2A:
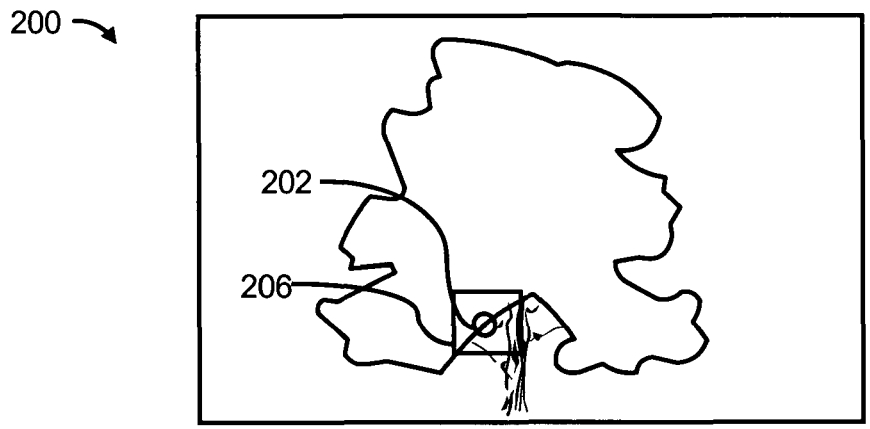
FIGS. 2A-2C, depict respective views of an image, which includes imaginary depictions of various tools implemented in restoring an image, according to an embodiment of the invention.

By way of example, and with reference to FIG. 2A, the defect detection unit 142 may generate an image 200 as shown in FIG. 2A, which depicts a top view of an image 200 containing a group 202 of undesirable pixels 204a-204n. More particularly, as shown in FIG. 2A, part of the shaded section, representing the leaves of a tree, is missing from the image 200. The undesirable pixels 204a-204n are depicted in greater detail in FIG. 2B, which is an enlarged view of a section 206 in the image 200.

The controller 130 may invoke or implement an image processing unit 150 to automatically replace the undesirable pixels 204a-204n in a relatively fast and accurate manner. Generally speaking, the image processing unit 150 is configured to compute new values for the undesirable pixels 204a-204n and to replace the undesirable pixels 204a-204n with the new pixel values without substantially smoothing features contained in the replacement pixels. The image processing unit 150 is also configured to determine the new pixel values in a relatively fast and efficient manner.

The defect detection unit 142 and the image processing unit 150 may comprise hardware components, software modules or combinations thereof. By way of example, either or both of the defect detection unit 142 and the image processing unit 150 may comprise circuits or computer chips configured to perform their variously described functions. As another example, either or both of the defect detection unit 142 and the image processing unit 150 may comprise software modules, which the controller 130 may invoke or implement to perform their variously described functions.

In instances where either or both of the defect detection unit 142 and the image processing unit 150 comprise software modules, the unit(s) 142, 150 comprising software modules may be stored in a memory, such as the data storage 140, accessible by the controller 130. The memory may comprise, for instance, volatile or non-volatile memory, such as DRAM, EEPROM, MRAM, flash memory, and the like. In addition, or alternatively, either or both of the units 142 and 150 comprising software modules may be stored on a removable media, such as, a compact flash memory device, an SD memory device, a floppy disk, a CD-ROM, a DVD-ROM, or other optical or magnetic media.

The functionalities of either or both of the units 142 and 150 may be combined into one unit, without departing from a scope of the electronic apparatus 102. In addition, or alternatively, either or both of the defect detection unit 142 and the image processing unit 150 may be composed of a plurality of separate units without departing from a scope of the electronic apparatus 102.

Figure 3:
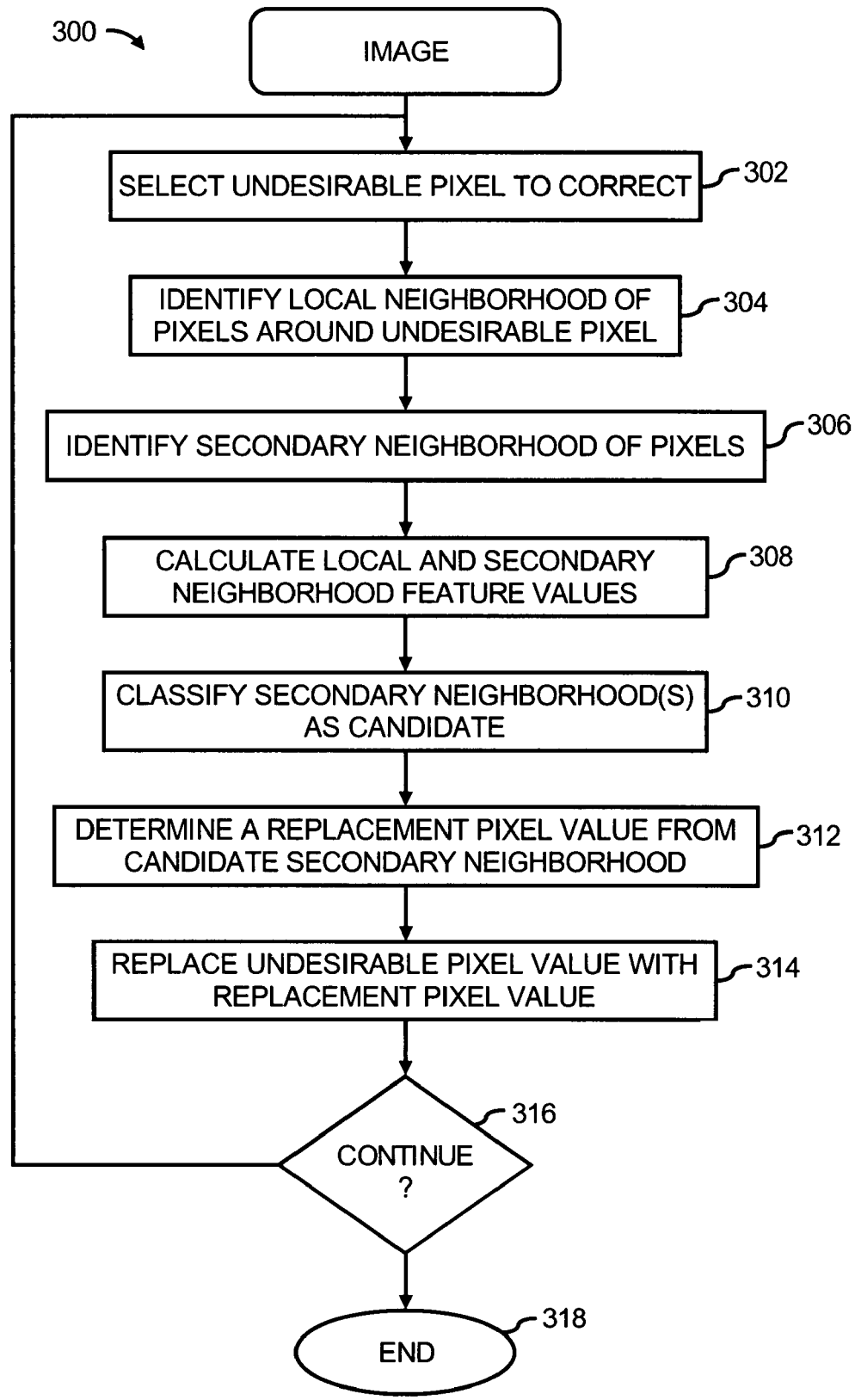
FIG. 3 depicts a flow diagram of a method of automatically replacing undesirable pixels in an image, according to an embodiment of the invention.

Various operations performed by the controller 130, the defect detection units 142, and the image processing unit 150 of the electronic apparatus 102 will be described with regard to the flow diagram depicted in FIG. 3. FIG. 3, more particularly, depicts a flow diagram of a method 300 of automatically replacing undesirable pixels in an image, according to an example. It should be understood that the following description of the method 300 is but one manner of a variety of different manners in which such a method 300 may be implemented. In addition, it should be understood that the method 300 may include additional steps and that some of the steps described herein may be removed and/or modified without departing from a scope of the method 300.

Figure 2B:
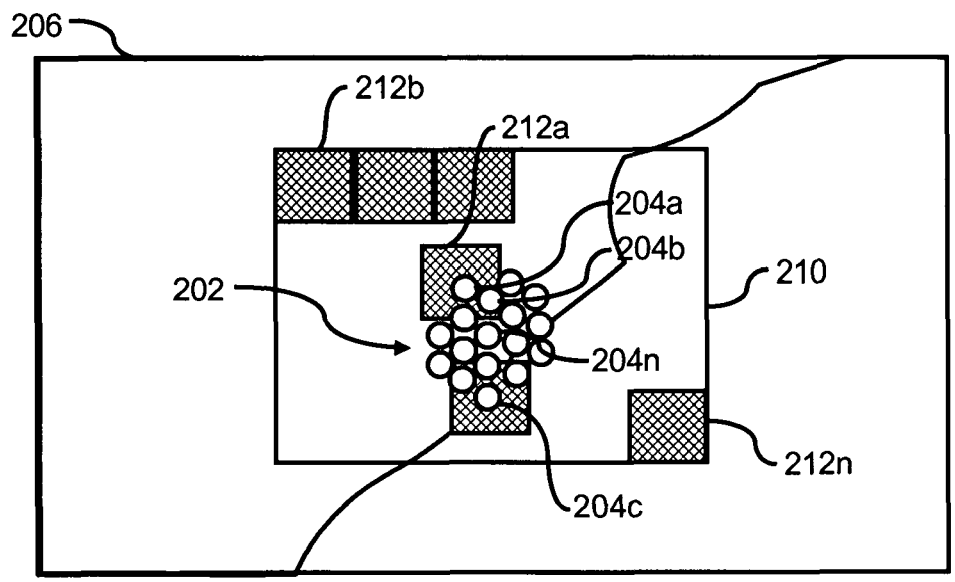

The following description of the method 300 is described with particular reference to the components depicted in FIG. 1 and the image 200 depicted in FIGS. 2A and 2B. It should, however, be understood that the method 300 may be performed by an electronic apparatus whose components differ from or comprise variations of the components depicted in FIG. 1 and an image that differs from the image 200, without departing from a scope of the method 300.

Generally speaking, an electronic apparatus 102 may implement the method 300 to automatically calculate replacement pixel values for undesirable pixels in an image 200, and to replace the undesirable pixel values with the replacement pixel values. As such, for instance, the electronic apparatus 102 may implement the method 300 to insert missing pixel values or to replace unwanted pixel values from an image in a relatively accurate manner.

At step 302, the controller 130 may implement the image processing unit 150 to select an undesirable pixel 204a to replace. The undesirable pixel 204a selected by the image processing unit 150 may be identified in a number of various manners. For instance, the undesirable pixel 204a may be part of a plurality of undesirable pixels 204a-204n identified in a defect/void map developed by the defect detection unit 142, the image processing unit 150, or by another computing device. As another example, a user may manually identify the locations of undesirable pixels 204a-204n through, for instance, identification of the undesirable pixels 204a-204n on a display. The user identification may also include a coarse user selection of the undesirable pixels 204a-204n as described in commonly assigned and co-pending U.S. patent application Ser. No. 11/799,070, entitled "Method and System of Processing an Image Containing Undesirable Pixels", filed on even date herewith, the disclosure of which is hereby incorporated by reference in its entirety.

In addition, at step 302, of a group of identified undesirable pixels 204a-204n, the image processing unit 150 may select an undesirable pixel 204a that is located at an outermost edge of the group 202 of identified undesirable pixels 204a-204n. As discussed in greater detail herein below, after the undesirable pixel 204a has been replaced, the image processing unit 150 may select an undesirable pixel 204b located at the next outermost edge of the group 202 to replace. The replaced outermost pixel 204a value may be used in the determination of the replacement pixel value of the undesirable pixel 204b located at the next outermost edge. This process may be repeated until all of the undesirable pixels 204a-204n have been replaced.

Figure 2C:
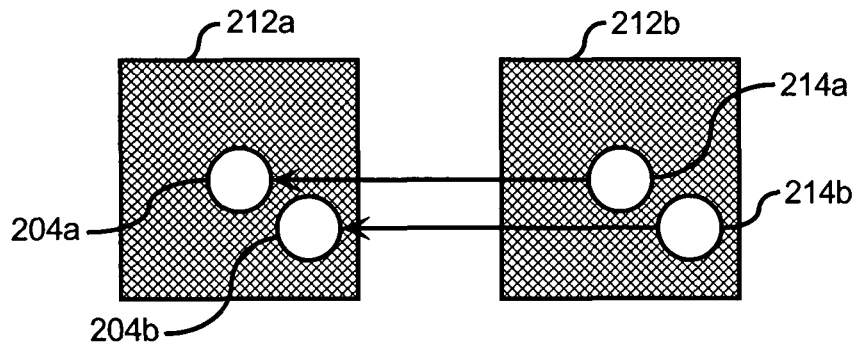

At step 304, the image processing unit 150 identifies a local neighborhood 212a of pixels around the undesirable pixel 204a. The number and arrangement of pixels contained in the local neighborhood 212a may vary among different applications. In addition, the number and arrangement of the pixels contained in the local neighborhood 212a may be determined according to a number of factors, such as, memory capacity, processor capabilities, desired speed, etc. By way of example, the local neighborhood 212a may have a square configuration of 7×7 pixels, 9×9 pixels, 11×11 pixels, etc. In addition, for instance, the undesirable pixel 204a may be positioned in a center of the local neighborhood 212a, as shown in FIGS. 2B and 2C. As another example, however, the undesirable pixel 204a may be positioned in a corner of the local neighborhood 212a to thereby substantially limit the number of undesirable pixels 204a-204n contained in the identified local neighborhood 212a.

At step 306, the image processing unit 150 identifies secondary neighborhoods 212b-212n of pixels. The secondary neighborhoods 212b-212n may comprise groups of pixels having the same or similar size as the local neighborhood 212a. In addition, the secondary neighborhoods 212b-212n may be defined with respective groups of pixels or with some or all of the pixels overlapping in a plurality of secondary neighborhoods 212b-212n. In any regard, the image processing unit 150 may identify secondary neighborhoods 212b-212n such that the secondary neighborhoods 212b-212n do not include the undesirable pixels 204a-204n.

According to an example, the image processing unit 150 may limit identification of the secondary neighborhoods 212b-212n to those pixels contained within a region 210 of the image 200. For instance, the region 210 may be selected to include an area around the undesirable pixel 204a from which the local neighborhood 212a and the secondary neighborhoods 212b-212n may be chosen. The region 210 may therefore be selected to be relatively larger than the local neighborhood 212a and the secondary neighborhoods 212b-212n. By way of example, the region 210 may be selected to include a predetermined number of pixels around the undesirable pixel 204a, such as, for instance, 100×100 pixels, 150×150 pixels, 200×200 pixels, etc. As another example, the region 210 may substantially be limited in size based upon the computing capabilities of the controller 130 and/or the capacity of the data storage 140.

In situations where the region 210 is relatively limited in size due to, for instance, relatively limited capacity in the data storage 140, the region 210 may be divided into several parts. Each of the several parts may be maintained within the limit of the data storage 140. In addition, a tree structure 500 (FIG. 5) for the secondary neighborhoods 212b-212n contained in each of the several parts may be developed and may be employed in determining the replacement pixel values, as described in greater detail herein below.

Although a relatively small number of secondary neighborhoods 212b-212n have been depicted in FIG. 2B, it should be understood that the region 210 may include any reasonably suitable number of secondary neighborhoods 212b-212n, including as many secondary neighborhoods 212b-212n as may be identified within the region 210.

At step 308, feature values of the local neighborhood 212a and each of the secondary neighborhoods 212b-212n are calculated. The feature values may comprise texture descriptors or textural measures of the local neighborhood 212a and each of the secondary neighborhoods 212b-212n. By way of example, the textural measures may include one or more of the mean, the standard deviation, the contrast, the maximum values, and the minimum values of the pixel values in each of the neighborhoods 212a-212n, averages of various sections within each of the neighborhoods 212a-212n, etc.

According to an example, the image processing unit 150 may calculate the feature values of the local neighborhood 212a without factoring values associated with the undesirable pixel 204a. In addition, the image processing unit 150 may calculate the feature values without factoring values associated with other undesirable pixels 204b-204n contained in the local neighborhood 212a, as shown in FIG. 2C. Moreover, the image processing unit 150 may calculate feature values of the secondary neighborhoods 212b-212n without factoring the values of the pixels located at positions corresponding to the locations of the undesirable pixels 204a, 204b. Thus, for instance, with respect to FIG. 2C, when calculating the feature value of the secondary neighborhood 212b, the image processing unit 150 may omit the values of the pixels 214a, 214b because these pixels 214a, 214b correspond in location to the undesirable pixels 204a, 204b in the local neighborhood. Alternatively, however, the image processing unit 150 may calculate the feature values of the secondary neighborhoods 212b-212n while factoring all of the pixels, for instance, when the feature values are pre-computed to substantially increase the speed at which the undesirable pixels are replaced.

At step 310, the image processing unit 150 classifies at least one of the secondary neighborhoods as a candidate from which a replacement pixel value for the undesirable pixel 204a may be determined. According to an example, the image processing unit 150 may consider a secondary neighborhood 212b-212n as being a candidate for pixel value replacement if the secondary neighborhood 212b-212n comprises feature values that are within a predetermined range of the local neighborhood 212a feature value. In one respect, the predetermined range may be selected to remove a substantially large number of secondary neighborhoods 212b-212n and thus pixels, from being considered as candidates for pixel value replacement. By way of example, the predetermined range may be selected such that approximately 10% of the secondary neighborhoods 212b-212n may be considered as candidates for pixel value replacement.

At step 312, the image processing unit 150 may determine a replacement pixel value from at least one of the secondary neighborhoods 212b-212n classified as a candidate for pixel value replacement. In determining the replacement pixel value, the image processing unit 150 may compare the sum of squared differences (SSD) of the local neighborhood 212a and the secondary neighborhoods 212b-212n. In addition, the values of the undesirable pixels may be omitted from the SSD comparison. Moreover, the image processing unit 150 may perform step 312 on the relatively small number of secondary neighborhoods 212b-212n classified as candidate neighborhoods. As such, the amount of time and processing power required to determine a replacement pixel value at step 312 may substantially be reduced as compared with conventional pixel replacement techniques.

In one example, the image processing unit 150 may compute the replacement pixel value to equal the pixel value corresponding to the secondary neighborhood 212b-212n yielding the lowest SSD value. In this example, therefore, the image processing unit 150 may determine which of the secondary neighborhoods 212b-212n yields the lowest SSD value with the local neighborhood 212a. The image processing unit 150 may then correlate the location of the undesirable pixel 204a in the local neighborhood 212a with a corresponding pixel location 214a in the selected secondary neighborhood 212b. The image processing unit 150 may extract the pixel value of the corresponding pixel location 214a and may select that pixel value as the replacement pixel value for the undesirable pixel 204a.

Although particular reference has been made herein to the computing of the replacement pixel value corresponding to the secondary neighborhood 212b-212n yielding the lowest SSD value, it should be understood that the replacement pixel value may be computed based upon other distance metrics. Thus, for instance, the replacement pixel value may be computed based upon a sum of absolute differences, a difference in mean values, etc. In addition, the replacement pixel value may be selected as the one that yields the lowest distance value between the local neighborhood 212a and the secondary neighborhoods 212-212n.

In addition, in situations where the local neighborhood 212a includes an additional undesirable pixel 204b, the image processing unit 150 may correlate the location of the additional undesirable pixel 204b in the local neighborhood 212a with a corresponding pixel location 214b in the selected secondary neighborhood 212b and may select that pixel value as the replacement pixel value for the additional undesirable pixel 204b, as shown in FIG. 2C.

In another example, the image processing unit 150 may compute a weighted average of pixel values in one or more of the candidate secondary neighborhoods 212b-212n that respectively correspond in location to the undesirable pixel in the local neighborhood being replaced. The weighting of the average pixel value from a particular secondary neighborhood may be based upon a distance metric of that secondary neighborhood 212b-212n with respect to the local neighborhood 212a. Thus, for instance, the average pixel values from secondary neighborhoods 212b-212n that have lower distance values with respect to the local neighborhood 212a may receive a higher weighting value. In this example, the image processing unit 150 may base the weighting according to the following equation:

$$\bar{q} = \frac{\sum_{P \in C} \exp\left(\frac{-\sum_{i=0}^{K-1} g_i \cdot (p_i - q_i)^2}{h^2}\right) \cdot p_0}{\sum_{P \in C} \exp\left(\frac{-\sum_{i=0}^{K-1} g_i \cdot (p_i - q_i)^2}{h^2}\right)}$$

Equation (1)

In Equation (1), $Q = q_0, q_1, q_2, \ldots, q_{K-1}$ is the two dimensional neighborhood 212a surrounding the undesirable pixel 204a where K is the number of pixels in the neighborhood and C is the set of candidate neighborhoods 212b-212n. For a neighborhood P in C, P is denoted as $P = p_0, p_1, p_2, \ldots, p_{K-1}$ and let $p_0$ denote the pixel in the neighborhood P corresponding to the undesirable pixel, which is denoted by $q_0$, which may comprise the central pixel in one example. In addition, $G = g_0, g_1, g_2, \ldots, g_{K-1}$ is a Gaussian spatial filter, and h is a real value weight lifter. For an undesirable pixel i in the neighborhood P, the corresponding value of the Gaussian filter $g_i$ is set to 0. As such, the image processing unit 150 may omit the values of the undesirable pixels in implementing Equation (1). Based upon the definitions provided above, the image processing unit 150 may calculate the replacement pixel value ($\bar{q}$) through implementation of Equation (1).

The determination of whether to use the minimum value or the weighted average may depend upon a desired outcome of the undesirable pixel replacement. For instance, the minimum value may regenerate texture relatively better than the weighted average; whereas, the weighted average may generate relatively more natural looking replacements. As such, for instance, the weighted average may be better suited for replacing undesirable pixels in relatively smooth areas. Thus, for instance, the image processing unit 150 may be configured to evaluate the level of texture around a undesirable pixel location, for instance, based upon the standard deviation around the undesirable pixel, and to determine whether to use the minimum value or the weighted average based upon the texture level.

At step 314, the image processing unit 150 may replace the undesirable pixel value(s) 204a, 204b with the replacement pixel value(s) determined at step 312. In addition, at step 316, the image processing unit 150 may determine whether to continue the method 300. The image processing unit 150 may determine that the method 300 is to end at step 318 if there are no further undesirable pixels 204b-204n or if manually discontinued. However, if the method 300 is to proceed, for instance, if there is at least one additional undesirable pixel 204b-204n, the image processing unit 150 may repeat steps 302-314 to automatically replace the undesirable pixel 204b-204n.

In addition, at step 302, if there are multiple undesirable pixels 204b-204n remaining in the image, the image processing unit 150 may select the next outermost undesirable pixel 204b to replace. In addition, the image processing unit 150 may factor the replacement pixel value for the undesirable pixel 204a in calculating the feature values of the neighborhoods 212a-212n at step 308. The image processing unit 150 may not calculate the feature values of the secondary neighborhoods 212b-212n again at step 308 and may instead rely upon the feature values calculated during the first iteration of step 308. In addition, the image processing unit 150 may rely upon the originally calculated feature values and may thus omit calculating the secondary neighborhood 212b-212n feature values during any further iteration of steps 302-314.

In this regard, the replacement pixel value for the undesirable pixel 204a may be used to more accurately determine replacement pixel values for other undesirable pixels 204b-204n. The image processing unit 150 may thus repeat steps 302-316 until all of the undesirable pixels 204a-204n have been replaced, even in situations where the undesirable pixels encompass relatively large sections of the image 200.

Figure 4:
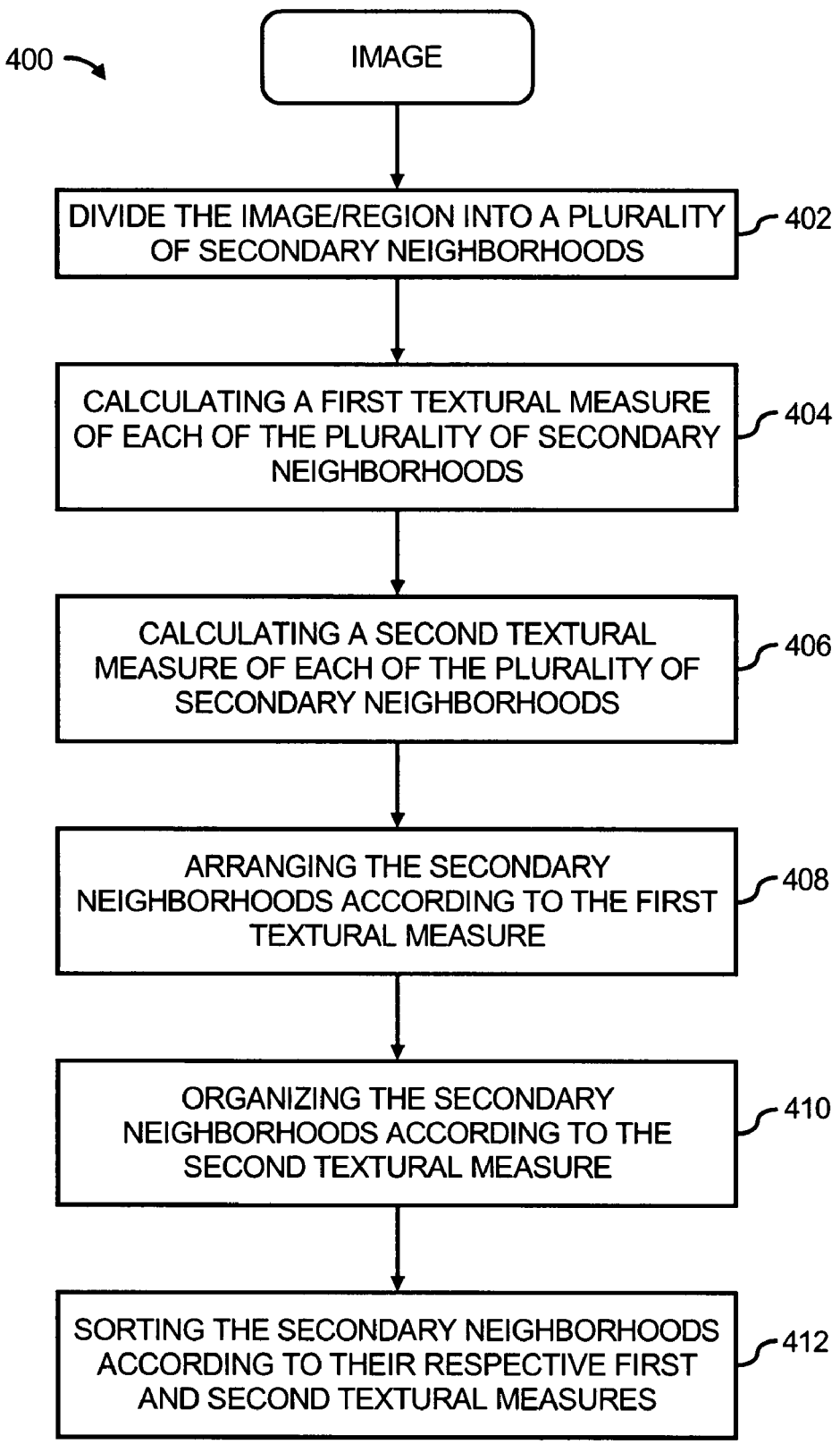
FIG. 4 depicts a flow diagram of a method of preprocessing secondary neighborhoods, according to an embodiment of the invention.

According to an example, at step 306, the secondary neighborhoods 212b-212n may be identified through use of a tree structure 500 (FIG. 5). The tree structure 500 may be constructed as discussed below with respect to the method 400 (FIG. 4). In any regard, the tree structure 500 may be constructed either during or before a first iteration of the method 300 to replace an undesirable pixel value. In addition, the tree structure 500 may be used for subsequent iterations of the method 300 to replace additional undesirable pixel values. In this regard, the feature values of the secondary neighborhoods 212b-212n may not need to be recalculated at step 308 when implementing the method 300 for another undesirable pixel. Instead, the feature values of the local neighborhood 212a need only be recalculated at step 308, which may include the replacement pixel value determined during a previous iteration of the method 300. The feature values of the local neighborhood 212a may then be used to select candidate secondary 212b-212n neighborhoods from the tree structure 500 at step 310, as discussed in greater detail herein below. In addition, steps 312 and 314 may be repeated to replace the additional undesirable pixel value.

According to another example, the tree structure 500 may be constructed for a particular group of undesirable pixels 204a-204n. More particularly, for instance, one tree structure 500 may be employed in determining replacement pixel values for the undesirable pixels 204a-204n located in one undesirable area, where the undesirable area is comprised of contiguous undesirable pixels 204a-204n. In addition, another tree structure 500 may be constructed for another group of undesirable pixels 204a-204n, and may be employed in determining replacement pixel values for that group of undesirable pixels 204a-204n.

With reference now to FIG. 4, there is shown a flow diagram of a method 400 of preprocessing the secondary neighborhoods 212b-212n, according to an example. It should be understood that the following description of the method 400 is but one manner of a variety of different manners in which such a method 400 may be implemented. In addition, it should be understood that the method 400 may include additional steps and that some of the steps described herein may be removed and/or modified without departing from a scope of the method 400.

Generally speaking, the steps contained in the method 400 may be implemented prior to implementation of the method 300 to generally reduce the amount of time and computational resources utilized by the controller 130 in implementing the method 300. In instances where the method 400 is implemented, step 306 and the part of step 308 where the secondary neighborhood feature values are calculated in the method 300 may be omitted. In addition, the manner in which the secondary neighborhoods 212b-212n are classified as candidates for pixel value replacement at step 310 may also be varied as discussed in greater detail herein below.

As shown in FIG. 4, the image 200, or the region 210 containing undesirable pixels 204a-204n, is divided into a plurality of secondary neighborhoods 212b-212n, as indicated at step 402. The image 200 or region 210 may be divided in various manners as discussed above with respect to step 304.

At step 404, a first textural measure of each of the plurality of secondary neighborhoods 212b-212n is calculated. In addition, at step 406, a second textural measure of each of the plurality of secondary neighborhoods 212b-212n is calculated. The first and second textural measures may include the mean value, the standard deviation value, the contrast, the maximum values, and the minimum values of the pixel values in each of the neighborhoods 212a-212n, averages of various sections within each of the neighborhoods 212a-212n, etc. According to an example, the first textural measure comprises mean values and the second textural measure comprises the standard deviation of the pixels contained in the secondary neighborhoods.

At step 408, the secondary neighborhoods 212b-212n are arranged according to their respective first textural measure values. In addition, at step 410, the secondary neighborhoods 212b-212n are organized according to their respective second textural measure values. The secondary neighborhoods 212b-212n are further sorted according to their respective first and second textural measure values, as indicated at step 412. An example of a manner in which the secondary neighborhoods 212b-212n may be sorted is depicted in FIG. 5.

FIG. 5, more particularly, depicts a tree structure 500 in which the secondary neighborhoods 212b-212n have been sorted based upon their respective textural measure values. More particularly, the tree structure 500 shows that the secondary neighborhoods 212b-212n may be arranged according to their respective first textural measure values 502 and their respective second textural measure values 504. In this regard, for instance, at step 310 (FIG. 3), those secondary neighborhoods 212b-212n having first and second textural measures that are within a predetermined range of the local neighborhood 212a first and second textural measures may quickly be identified through use of the tree structure 500. As such, the secondary neighborhoods 212b-212n that are classified as candidates for pixel value replacement may be relatively quickly identified, without substantial computing power during implementation of the method 300.

According to an example, the image processing unit 150 may calculate the values for the tree structure 500. The image processing unit 150 may also create the tree structure 500 in the form of a lookup table, for instance, and may store the tree structure 500 in the data storage 140 for relatively fast access to the candidate secondary neighborhoods 212b-212n. In creating the tree structure 500, the image processing unit 150 may base the range of values of the first textural measures 502 and the second textural measures 504, such that, a number of candidate secondary neighborhoods 212b-212n fall within each set of textural measure 502, 504 combinations. The number of candidate secondary neighborhoods 212b-212n may be selected to generally provide a sufficient number of secondary neighborhoods 212b-212n from which replacement pixel values may be determined for local neighborhoods 212a having relatively diverse textural measure 502, 504 combinations. Thus, although FIG. 5 depicts bins of the first textural measure 502 as being divided equally, the first textural measure 502 bins may be divided, as well as the second textural measure 504 bins, in any reasonably suitable manner that sorts the secondary neighborhoods 212b-212n into the desired number of candidate secondary neighborhoods 212b-212n that fall within each set of textural measure 502, 504 combination.

The image processing unit 150 may implement the tree structure 500 to substantially narrow the search for candidate secondary neighborhoods 212b-212n by determining the textural measures of the local neighborhood 212a and comparing those values with those contained in the tree structure 500. For instance, the secondary neighborhoods 212b-212n having values between 81 and 170 under the first textural measure 502 and values around 20 under the second textural measure 504 may be considered as candidates for a local neighborhood 212a having a first textural measure value of 100 and a second textural measure value of 22.

Although the secondary neighborhoods 212b-212n have been described and depicted as being sorted based upon two textural measures, it should be understood that the secondary neighborhoods 212b-212n may be sorted or arranged according to any reasonably suitable number of textural measures without departing from a scope of the methods 300 and 400. For instance, in addition to the mean and standard deviation values, a third textural measure, such as, contrast, may be used to further distinguish the secondary neighborhoods 212b-212n from each other.

Through implementation of the method 300, undesirable pixel values may be replaced in a highly accurate and efficient manner. That is, the pixel values may be replaced while retaining an accurate representation of texture in the replacement pixel values. In addition, the method 300 enables the replacement pixel value determination to be efficient because it does not require relatively complex calculations to be performed on all of the neighboring pixels, but instead, performs the calculations on those pixels or neighborhoods of pixels determined to be candidates for pixel value replacement. The efficiency of the method 300 is further enhanced through implementation of the method 400 which increases the speed at which the candidate secondary neighborhoods 212b-212n are determined.

The operations set forth in the methods 300 and 400 may be contained as at least one utility, program, or subprogram, in any desired computer accessible medium. In addition, the methods 300 and 400 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method of automatically replacing undesirable pixels in an image, said method comprising:
   identifying a local neighborhood of pixels around an undesirable pixel;
   identifying secondary neighborhoods of pixels;
   calculating feature values of the pixels contained in the local neighborhood and each of the secondary neighborhoods;
   classifying the secondary neighborhoods having feature values within a predetermined range of the local neighborhood feature value as candidates for pixel value replacement;
   determining a replacement pixel value from at least one of the secondary neighborhoods classified as a candidate for pixel value replacement; and
   replacing, by an electronic apparatus, the undesirable pixel value with the replacement pixel value.

2. The method according to claim 1, further comprising:
   identifying a region around the undesirable pixel, wherein the local neighborhood and the secondary neighborhoods are contained within the region, and wherein the region is substantially smaller than a perimeter of the image.

3. The method according to claim 1, wherein calculating a local neighborhood feature value further comprises calculating textural measures of the local neighborhood and wherein calculating feature values of the secondary neighborhoods further comprises calculating textural measures of the secondary neighborhoods.

4. The method according to claim 3, further comprising:
   preprocessing the secondary neighborhoods according to their respective textural measures prior to classifying the secondary neighborhoods, wherein preprocessing the secondary neighborhoods further comprises,
   arranging the secondary neighborhoods according to a first textural measure; and
   organizing the arranged secondary neighborhoods according to a second textural measure.

5. The method according to claim 4, further comprising:
   creating a tree structure that depicts the secondary neighborhoods according to combinations of their first textural measures and their second textural measures, wherein the combinations of the first textural measures and the second textural measures are selected to provide a number of candidate secondary neighborhoods that fall within each of the first textural measure and second textural measure combination.

6. The method according to claim 5, wherein the first textural measure comprises mean values and the second textural measure comprises standard deviations, wherein preprocessing the secondary neighborhoods further comprises:
sorting the secondary neighborhoods according to their respective mean values and standard deviation levels to facilitate matching of the textural measures of the local neighborhood and the secondary neighborhoods for classifying the secondary neighborhoods.

7. The method according to claim 5, further comprising:
following replacement of the undesirable pixel value, selecting another undesirable pixel value;
identifying another local neighborhood of pixels around the another undesirable pixel value;
calculating feature values of the pixels contained in the another local neighborhood;
identifying a second set of secondary neighborhoods of pixels that are classified as candidates for pixel value replacement from the tree structure based upon the feature values of the pixels contained in the another local neighborhood;
determining another replacement pixel value from at least one of the second set of secondary neighborhoods classified as a candidate for pixel value replacement; and
replacing the another undesirable pixel value with the another replacement pixel value.

8. The method according to claim 5, wherein creating the tree structure further comprises creating the tree structure for a first group of undesirable pixels, said method further comprising:
creating a second tree structure of a second group of undesirable pixels.

9. The method according to claim 1, wherein determining a replacement pixel value from at least one of the pixels classified as a candidate pixel further comprises:
computing a distance metric between the local neighborhood and the secondary neighborhoods classified as candidates for pixel value replacement; and
wherein determining a replacement pixel value further comprises determining the replacement pixel value from the secondary neighborhood based upon the distance metric.

10. The method according to claim 9, wherein determining the replacement pixel value further comprises:
computing a weighted average of pixel values contained in one or more of the secondary neighborhoods classified as candidates for pixel value replacement, wherein the weighting of the average pixel values from the secondary neighborhoods are based upon distance metrics of the secondary neighborhoods with respect to the local neighborhood; and
determining the replacement pixel value as equaling the computed weighted average of the pixels.

11. The method according to claim 10, further comprising:
evaluating a texture level in the local neighborhood around the undesirable pixel location; and
determining a replacement pixel value from at least one of the pixels classified as a candidate pixel further comprises computing a distance metric and determining the replacement pixel value as the lowest distance value in response to the texture level being relatively high and computing the weighted average and determining the replacement pixel value as equaling the computed weighted average in response to the texture level being relatively low.

12. A computerized imaging system comprising:
an image processing unit; and
a controller configured to at least one of invoke and implement the image processing unit to replace undesirable pixels in an image, wherein the image processing unit is configured to identify a local neighborhood around an undesirable pixel, to identify secondary neighborhoods of pixels, to calculate feature values of the pixels contained in the local neighborhood and each of the secondary neighborhoods, to classify the secondary neighborhoods having feature values within a predetermined range of the local neighborhood feature value as candidates for pixel value replacement, to determine a replacement pixel value from at least one of the secondary neighborhoods classified as a candidate for pixel value replacement, and to replace the undesirable pixel value with the replacement pixel value.

13. The imaging system according to claim 12, wherein the feature values comprise textural measures.

14. The imaging system according to claim 13, wherein the image processing unit is further configured to preprocess the secondary neighborhoods according to their respective textural measures prior to classifying the secondary neighborhoods by arranging the secondary neighborhoods according to a first textural measure, organizing the arranged secondary neighborhoods according to a second textural measure, and by sorting the secondary neighborhoods according to their respective first textural measures and second textural measures.

15. The imaging system according to claim 14, wherein the image processing unit is further configured to develop a tree structure of the first and second textural measures, wherein the secondary neighborhoods are sorted according to their respective first and second textural measures in the tree structure.

16. The imaging system according to claim 12, wherein the image processing unit is further configured to compute a distance metric between the local neighborhood and the secondary neighborhoods classified as candidates for pixel value replacement, and to determine the replacement pixel value from the secondary neighborhood based upon the distance metric.

17. The imaging system according to claim 16, wherein the image processing unit is further configured to compute a weighted average of pixel values in one or more of the secondary neighborhoods classified as candidates for pixel value replacement, wherein the weighting of the average pixel values from the secondary neighborhoods is based upon distance metrics of the secondary neighborhoods with respect to the local neighborhood, and to determine the replacement pixel value as equaling the computed weighted average of the pixels.

18. A non-transitory computer readable storage medium on which is embedded one or more computer programs, said one or more computer programs implementing a method for automatically replacing undesirable pixels in an image, said one or more computer programs comprising computer readable code for:
identifying a region around the undesirable pixel;
identifying a local neighborhood of pixels around the undesirable pixel within the region;
identifying secondary neighborhoods of pixels within the region;
calculating feature values of the pixels contained in the local neighborhood and each of the secondary neighborhoods;

classifying the secondary neighborhoods having feature values within a predetermined range of the local neighborhood feature value as candidates for pixel value replacement;

determining a replacement pixel value from at least one of the secondary neighborhoods classified as a candidate for pixel value replacement; and replacing the undesirable pixel value with the replacement pixel value.

19. The non-transitory computer readable storage medium according to claim 18, said one or more computer programs further comprising computer readable code for:

preprocessing the secondary neighborhoods according to their respective textural measures prior to classifying the secondary neighborhoods, wherein preprocessing the secondary neighborhoods further comprises, arranging the secondary neighborhoods according to a first textural measure;

organizing the arranged secondary neighborhoods according to a second textural measure; and sorting the secondary neighborhoods according to their respective first textural measure values and their respective second textural measure values to facilitate matching of the textural measures of the local neighborhood and the secondary neighborhoods for classifying the secondary neighborhoods.

20. The non-transitory computer readable storage medium according to claim 18, said one or more computer programs further comprising computer readable code for:

developing a tree structure of the first and second textural measures, wherein the secondary neighborhoods are sorted according to their respective first and second textural measures in the tree structure; and wherein classifying the second neighborhoods further comprises classifying the secondary neighborhoods according to their respective locations in the tree structure.

* * * * *